(12) United States Patent
Sundholm

(10) Patent No.: US 7,146,938 B2
(45) Date of Patent: Dec. 12, 2006

(54) WATER SPRAYING SYSTEM

(75) Inventor: Göran Sundholm, Tuusula (FI)

(73) Assignee: Marioff Corporation Oy, Vantaa (FI)

( * ) Notice: Subject to any disclaimer, the term of this patent is extended or adjusted under 35 U.S.C. 154(b) by 0 days.

(21) Appl. No.: 10/511,941

(22) PCT Filed: Apr. 16, 2003

(86) PCT No.: PCT/FI03/00303

§ 371 (c)(1),
(2), (4) Date: May 5, 2005

(87) PCT Pub. No.: WO03/089777

PCT Pub. Date: Oct. 30, 2003

(65) Prior Publication Data

US 2005/0172916 A1    Aug. 11, 2005

(30) Foreign Application Priority Data

Apr. 19, 2002    (FI) .................................. 20020756

(51) Int. Cl.
*F02B 47/02* (2006.01)

(52) U.S. Cl. .................................. 123/25 A; 123/25 J

(58) Field of Classification Search ..... 123/25 R–25 Q
See application file for complete search history.

(56) References Cited

U.S. PATENT DOCUMENTS

| 1,665,885 | A | * | 4/1928 | Le Mesurier ............. 123/25 K |
| 4,165,610 | A | * | 8/1979 | Iizuka et al. ............. 123/198 F |
| 4,377,135 | A |   | 3/1983 | Abthoff et al. |
| 4,960,080 | A |   | 10/1990 | O'Neill et al. |
| 5,148,776 | A |   | 9/1992 | Connor |

FOREIGN PATENT DOCUMENTS

DE    3405899 A1    9/1985

* cited by examiner

*Primary Examiner*—Noah P. Kamen
(74) *Attorney, Agent, or Firm*—Ladas and Parry LLP

(57) ABSTRACT

A water spraying system, especially for the humidification of the intake air of a piston engine to reduce nitrogen oxide emissions, said system comprising at least one nozzle (9, 10, 11, 12, 13) for spraying an aqueous liquid mist into the air intake duct (2) and means for conveying the liquid to be sprayed to the nozzle. The system comprises means for accomplishing the injection of a spray of aqueous liquid mist to at least one point in the air intake duct (2) depending on the load and/or speed of rotation and/or temperature of the engine.

17 Claims, 5 Drawing Sheets

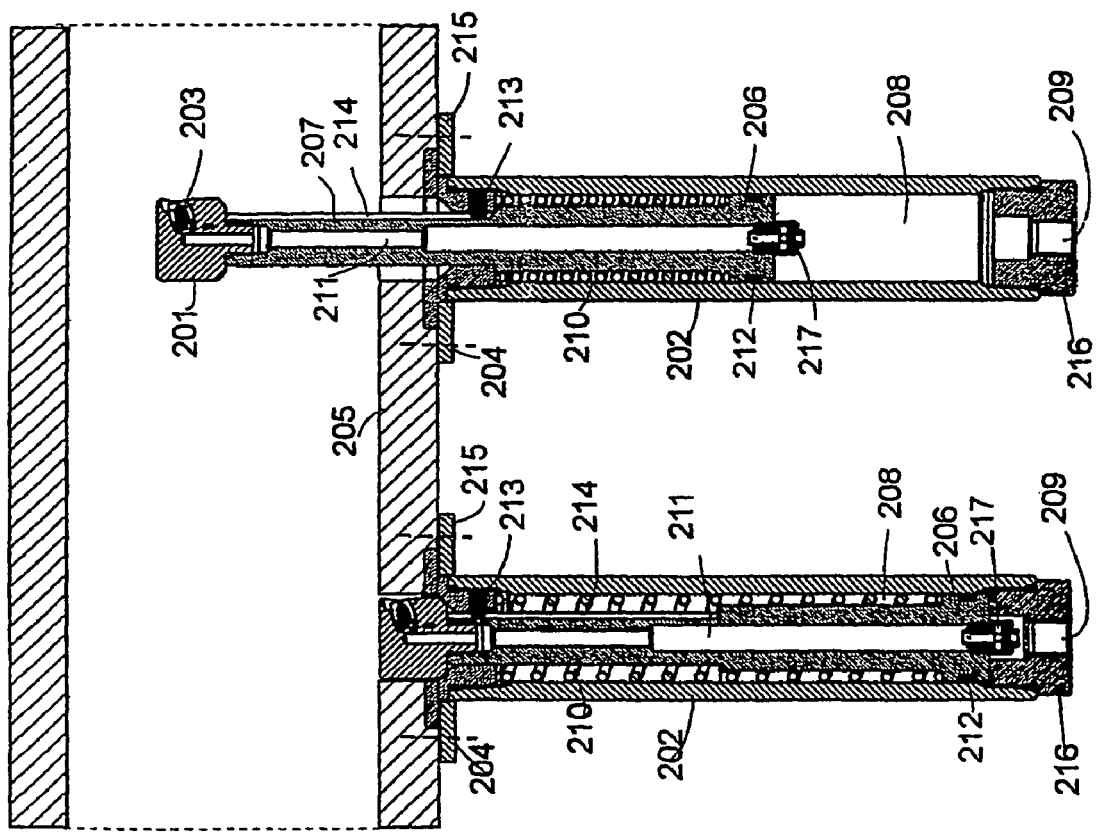

WATER SPRAYING SYSTEM

BACKGROUND OF THE INVENTION

The present invention relates to a water spraying system as defined in the preamble of claim 1.

The invention concerns specifically a system for supplying an aqueous liquid mist into the intake air of a preferably turbocharged piston engine to reduce nitrogen oxide emissions (NOx). At the high combustion temperatures, the combustion process in the cylinders of a piston engine produces nitrogen oxides, which are emitted together with the exhaust gas into the atmosphere. Because of the harmful climatic effects of nitrogen oxide emissions, efforts are undertaken to minimize their production.

As is known, adding water to the combustion process either in the form of water vapor or water droplets reduces the formation of nitrogen oxides. This phenomenon is based on a cooling effect. When the water sprayed into the cylinder is evaporated, it reduces the temperature of the air in the cylinder while at the same time reducing the pressure. The pressure drop has an adverse effect on the efficiency, although the decrease of pressure and temperature has a favorable effect on the formation of nitrogen oxides. When the water is supplied in the form of droplets together with the intake air, some of it is additionally wasted during the scavenging period and water consumption is increased. When air saturated with water vapor is supplied into the cylinder, the thermal capacity of the filling gas is increased and the gas has a substantially greater effect of reducing the temperatures of the combustion process than does dry air. The effect of reducing the combustion temperatures increases with the water vapor concentration, yet without producing an undesirable effect on efficiency. Since an increase in the temperature of the gas supplied into the cylinder also augments the generation of nitrogen oxides as well as the consumption of water, it is desirable to keep the gas temperature as low as possible, yet high enough to ensure that the gas supplied into the cylinder contains an amount of water vapor sufficient for the reduction of nitrogen oxides.

An apparatus for vaporizing a desired amount of water is disclosed in U.S. Pat. Nos. 5,758,606 and 6,196,165. A drawback with this apparatus is that the device mounted between the turbocharger and the cylinder increases the cubic volume of the air intake ductwork, which has a considerable effect on the power output of the engine. The power output is dependent on the cubic volume after the turbocharger because during power increase or decrease the air pressure produced by the turbocharger increases the density of the air and the amount of gas supplied into the cylinder. If the cubic volume between the turbocharger and the cylinder is increased, then it will take considerably longer before the amount of air produced by the turbocharger brings the pressure to the desired level and the power generated by the engine increases. Another drawback with the apparatus is that the heated water used for vaporization and flushed over the evaporation surfaces has the effect of increasing the temperature of the air. The device is unable to make use of the cooling effect produced in connection with the vaporization of the water, but the gas output from the device is at a relatively high temperature, so the amount of water vapor required for the reduction of nitrogen oxides and therefore also the water consumption are increased considerably.

Specification WO98/10185 again discloses an apparatus In which the air produced by a turbocharger and the pressure of this air are utilized in the injection of water for humidifying the air supplied to the turbocharger. A drawback with this system is the relatively low temperature of the supply air, which is why the amount of water vapor evaporated into the air remains small, and thus no significant nitrogen oxide reducing effect is achieved. Another drawback is that when the amount of water is increased, the water droplets can not be evaporated after the air has reached a saturated state, with the result that the water droplets drift into the turbocharger and cause wear of the turbocharger vanes through droplet erosion. From a thermodynamical viewpoint, the drifting of droplets into the turbocharger is desirable as it reduces the work performed by the turbocharger, increasing the pressure of the pressurized air produced at the output and simultaneously reducing its temperature. In practice, however, an air compressor rotating at a very high speed—about 50,000–100,000 rpm—has proved to be very sensitive to droplet erosion as referred to above.

The object of the present invention is to achieve a water spraying system designed for supplying water mist into the air intake ductwork of especially a piston engine and allowing the drawbacks of prior-art to be avoided.

The system of the invention is mainly characterized in that the system comprises means for producing adjustable water mist spraying at at least one point in the air intake duct, depending on the load and/or speed of rotation and/or temperature of the engine.

The system of the invention is additionally characterized by what is stated in claims 2–17.

The solution of the invention has numerous significant advantages. In the apparatus of the invention, the above-described undesirable effects and deficiencies are eliminated by using adjustable water spraying, which is distributed to one or more points in the air intake duct by varying the number and/or size and/or quality of the nozzles used, depending on the load and temperature of the engine. According to the invention, the water flux is distributed to a number of small nozzles to make it possible to produce sufficiently small droplets and/or to distribute such droplets over a larger are in the air intake duct so as to achieve an optimal vaporization. In the system of the invention, the spraying can also be focused on optimal points in the air intake ductwork where the temperature and/or air flow is highest. In the system of the invention, the number of nozzles spraying, the point and/or direction of injection of the spray in the air intake ductwork can be varied according to the amount of water needed, e.g. on the basis of the load and/or speed of rotation of the engine. In the system of the invention, it is further possible to maintain a high nozzle pressure so as to keep the droplet size of the mist being sprayed sufficiently small. Furthermore, the system allows the spraying to be varied between nozzles having different properties. The system of the invention produces an optimal droplet size of the liquid injected into the intake air. By using a nozzle cleaning system as part of the water spraying system, very reliable operation of the system is achieved because the possibility of nozzles being clogged is avoided. By using pop-up nozzles as part of the system, the risk of the nozzles being clogged is further reduced. On the other hand, by using pop-up nozzles, the nozzles are no impediment to the flow in the air intake duct when the system is out of use.

As the apparatus is connected directly to the structures of the air intake duct and it produces a fine mist directly without using any extra chambers or other containers, it is able to make full use of the heat quantity required for the vaporization of the water, cooling the intake air at each spray injection point to a temperature close to the wet bulb temperature (or adiabatic saturation temperature, which in the case of a water-air mixture is practically the same thing), i.e. to the temperature to which the air temperature can be reduced by vaporization of water. As connecting the apparatus of the invention to a turbocharged engine does not involve any changes in the cubic volume of the air intake system, it has no adverse effect on the power output of the engine, either.

Another advantage of the invention is that the humidity of the intake air can be increased stepwise after each heat supply point, thus adjusting the humidity of the gas fed into the cylinder and therefore the formation of nitrogen oxides within desired limits.

BRIEF DESCRIPTION OF THE FIGURES

In the following, the invention will be described in detail by the aid of an example with reference to the attached drawings, wherein FIGS. 2a, 2b presents sectioned view of a spraying head in the system of the invention.

DETAILED DESCRIPTION OF THE INVENTION

Figure 1:
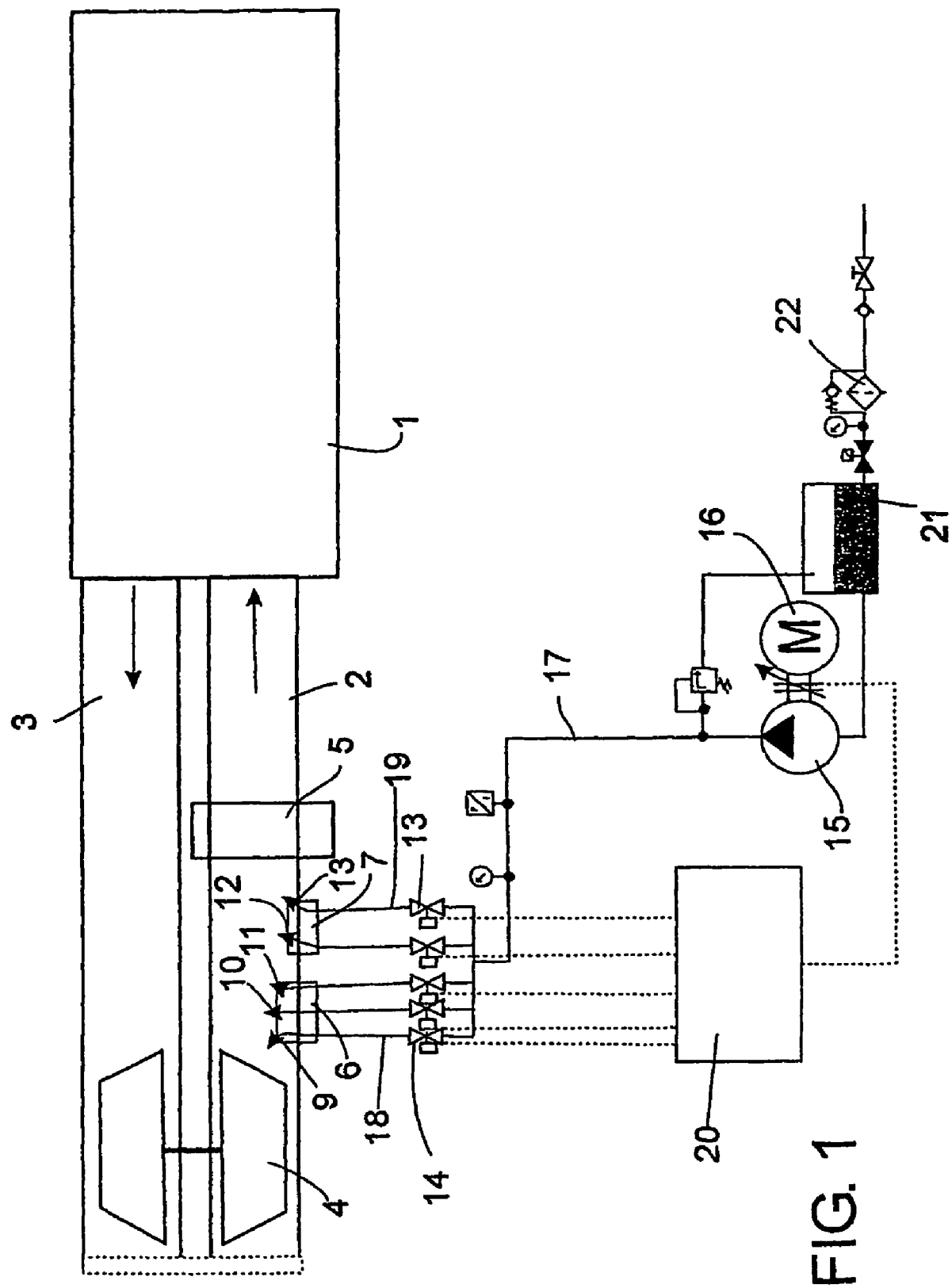
FIG. 1 presents a system according to the invention in connection with a turbocharged piston engine.

As stated, the invention concerns a water spraying system, especially for humidification of the intake air of a piston engine 1 to reduce nitrogen oxide emissions, said system comprising at least one nozzle 9, 10, 11, 12, 13 for spraying an aqueous liquid mist into the air intake duct 2 and means 21, 15, 17, 18, 9–13 for conveying a liquid to the nozzle. The system comprises means for producing adjustable water spraying at at least one point in the air intake duct 2, depending on the load and/or speed of rotation and/or temperature of the engine. In the system, the amount of water (water flux) to be injected into the air intake duct 2 is distributed to a number of nozzles 9, 10, 11, 12, 13. The water flux is typically distributed to a plurality of small nozzles to achieve a small droplet size. The amount of water to be injected is distributed in the air intake duct 2 over a larger area to accomplish an optimal vaporization, preferably at points where the temperature and/or air flow rate is high, preferably highest, or in the vicinity of such points. In the system, the number of nozzles spraying 9, 10, 11, 12, 13 is adapted/adaptable according to the required amount of water to be sprayed. The point and/or direction of injection of the water mist spray is adapted/adaptable according to the required amount of water to be injected. The system is designed to maintain a high nozzle pressure to keep the spraying liquid's droplet size small. The system preferably comprises nozzles 9, 10, 11, 12, 13 having different properties, permitting the number of and/or nozzle type of the nozzles spraying to be varied according to the amount of water required. Several nozzles 9, 10, 11; 12, 13 in the system may be arranged on the same mounting frame 6, 7.

The system comprises control equipment by means of which the spraying action of at least some of the nozzles 9–13 can be adjusted.

The system comprises at least one valve element 13, 14, by means of which the liquid flow passage to the nozzle 9–13 is adjusted and/or opened/closed. The system comprises a control system which maintains an at least nearly constant pressure or a predetermined pressure level in at least one supply pipe 17 leading to the nozzles regardless of the output of the pump 15. An embodiment of the system comprises an output regulating pump unit which controls the pressure so that the pressure in at least one supply pipe leading to a nozzle is constant. Another embodiment of the system employs a control system which comprises a constant-output pump and controls the pressure by means of a valve system to produce a constant pressure in at least one supply pipe leading to a nozzle. The system further comprises a system for cleaning the nozzles and/or keeping the nozzles clean.

FIG. 1 is a diagrammatic representation of a system/apparatus according to the invention, installed in connection with the air intake duct 2 of a piston engine, such as a diesel engine. The air intake duct 2 and the exhaust gas duct 3 are shown in a simplified form in the figure. The engine presented in the figure is provided with intake air compressor 4, which feeds air under positive pressure into the air intake ductwork 2 of the engine. To reduce the nitrogen oxide emissions of the engine, the air intake ductwork is provided with at least one nozzle 9–13 fitted to supply water mist into the intake ductwork 2. In the case illustrated in the figure, the intake ductwork is also provided with a heat exchanger element 5, such as a charge-air intercooler, which also functions as a heater.

At least one of the nozzles in the spraying system is connected directly to the structures of the air intake duct 2, and a fine mist is produced directly into the intake air in the air intake duct by means of its nozzle head 6, 7 comprising at least one nozzle. When the solution of the invention is used, no extra chambers or other containers need to be provided in the air intake ductwork. The nozzles feed water mist under a high pressure into the air intake duct. The apparatus comprises means for producing the required amount of water to the desired pressure and to achieve a droplet size as favorable as possible. The pressure in the liquid supply piping is typically over 10 bar, preferably over 30 bar, most preferably over 50 bar. The pressure may be typically between 10–300 bar. The liquid, especially aqueous liquid injected into the air intake ductwork is a fine mist. 50% of the water volume (Dv50) is in the form of droplets typically having a droplet size below 200 micrometers, preferably below 100 micrometers and more preferably below 50 micrometers. Under high load conditions, the droplet size may be larger.

The system comprises means for supplying an aqueous liquid to the nozzles. In the embodiment presented in FIG. 1, the system comprises a liquid source 21, from where the liquid is pumped through a pipe 17 by means of a pump 15. The pump is operated by a drive 16. The pump is typically a high pressure pump, e.g. a displacement pump. The liquid can be directed via channels 18, 19 to different nozzles 9–13. As shown in FIG. 1, several nozzles 9–11; 12–13 can be connected to the same mounting frame 6, 7. The mounting frame 6, 7 presented in the figure has a separate channel for each one of the nozzles 9, 10, 11, 12, 13. This makes it possible to control the pressure and/or flow of the pressure medium supplied to each nozzle 9, 10, 11, 12, 13 individually. According to another embodiment of the invention, the nozzles of the spraying head can be arranged in groups so that one feed channel leads to several nozzles. The nozzles in the spraying head may have different properties, which have been adapted according to the placement of each nozzle. The form of the spraying head, the number of nozzles and their orientation may vary depending on the application. It is also possible to supply different mediums to the nozzle, such as water and gas. The figure does not show the nozzles in detail, but they may be replaceable depending on the application. The nozzles are therefore of a type such that they produce a spray of fine mist when supplied with liquid under a high pressure. Many kinds of nozzles of this category are known, e.g. from fire extinguishing technology employing water mist. For example, specifications WO 92/20454 and WO 94/06567 disclose nozzles that produce a water mist at a high pressure. Naturally, other types of nozzles may also be used, e.g. specification WO 01/45799 discloses yet another nozzle.

The flow direction of the intake air in the intake ductwork 2 is indicated by an arrow in the figure.

The direction of injection of the liquid mist sprayed through the nozzles is typically so selected that a maximal relative difference of velocity and temperature is achieved.

The amount of water supplied through the nozzles typically increases with increasing engine load. Thus, when the engine load is low, it is possible to supply water only to some of the nozzles and increase the number of nozzles spraying when the load increases. Similarly, the spraying head can be provided with nozzles having different properties, such as flow rate, droplet size produced by the nozzles, etc. It is thus possible to form different combinations which can be adapted to a wide range of different applications, different engine types, different placements and conditions.

Typically, the amount of water supplied through the nozzles increases as the engine load increases. This can be implemented e.g. by using a control system whereby the speed of rotation of the pump 16 is increased by the drive device driving the pump. This increases the pressure in the supply piping 17 and, based on data provided by a pressure transmitter, liquid flow passages 18, 19 are opened for more nozzles 9–13 and/or a nozzle having a greater spraying capacity is engaged by opening a liquid flow passage for it. Similarly, when the load decreases, the liquid flow passages are closed for some of the nozzles and/or a nozzle with a lower spraying capacity is engaged. Correspondingly, an arrangement can be used such that, when the load is low, liquid is injected from nozzles producing a smaller droplet size, and when the load increases, the droplet size is increased, e.g. by opening a liquid flow passage to nozzles producing larger droplets. It is also possible to use an arrangement such that, in low-load conditions involving a lower temperature, the pressure in the supply piping is higher, smaller droplets being thus produced by the nozzle when the load is small.

The control can also be implemented by using constant power control to control the pump unit. The power of the pump unit equals the pressure in the piping multiplied by the quantity of liquid flowing per unit of time (P[kW]=p[bar]*Q[l/min]=constant). This control mode aims at keeping the power of the pump unit constant. When the rate of flow increases, the pressure is reduced and vice versa, so that the power remains substantially constant or nearly constant.

The embodiments described above are only examples. Accordingly, in some embodiments the amount of water supplied is reduced according to engine load.

The apparatus of the invention is able to make full use of the quantity of heat required for the vaporization of the water, cooling the intake air at each spray injection point to a temperature close to the wet bulb temperature (or adiabatic saturation temperature, which in the case of a water-air mixture is practically the same thing), i.e. to the temperature to which it is possible to reduce the air temperature by vaporization of water.

In the apparatus of the invention, the humidity of the intake air is preferably increased stepwise after each heat supply point. In the direction of the intake air flow, water mist is injected before the last heat supply point, which can advantageously be used as a water evaporation surface. By this arrangement, the humidity of the gas fed into the cylinder and therefore the formation of nitrogen oxides is regulated within the desired limits.

The apparatus comprises a system required for the control of the amount of water to be injected, by means of which the amount of water to be evaporated into the intake air and the cooling of the intake air can be controlled. The apparatus comprises valve elements 13, 14 arranged in connection with the liquid flow passages leading to the nozzles, e.g. in connection with the pipes 18, 19. The valves 13, 14 are typically controlled by a control system 20, allowing the liquid flow passages 18, 19 to be opened and closed as necessary.

FIGS. 2a and 2b present an embodiment of a spraying head that can be utilized in the system. The spraying head 201 for humidifying the intake air of a piston engine comprises at least one nozzle 203 and one channel 211 for feeding a liquid humidifying the intake air into the air intake duct 205 or into a space leading to the air intake duct. The spraying head is movable between at least two positions, a first position, in which first position the spraying head is retracted, and a second position, in which second position the spraying head 201 is protruding. In the non-active state, in the first position (FIG. 2a), the spraying head is in a retracted position, whereas in the active state, in the second position (FIG. 2b), at least one nozzle 203 of the spraying head extends to a position inside the air intake duct relative to the level of the interior surface of the air intake duct 205 and/or the edges of the spraying head holder 202.

The holder 202 is provided with at least one guide element 213, and the spraying head, preferably its shank part 207, with at least one mating surface 214 matching the guide element for keeping the spraying head in the desired orientation. The guide element 213 is e.g. a groove to which a ridge in the shank element, aligned in the direction of motion, is fitted. The guide element may also consist of e.g. rolling elements, such as balls or rollers, with a counter element 214 movably fitted between these.

The spraying head 201, preferably its shank part 207, and the holder 202 are arranged to function as a cylinder-piston combination in which the spraying head, preferably its shank part 207, is provided with a piston part 206 and the holder 202 comprises a cylinder chamber 208, the piston part being movably fitted in it. In the embodiment in FIG. 2a, pressure medium is supplied from the inlet 209 through a pipe element (not shown) into the cylinder chamber space below the piston 206 from the distant end 216 of the holder 202 relative to the air intake duct 205. By the action of the pressure medium, the piston moves upwards in the figure, thereby causing the spraying head 201 mounted on the shank part 207 to move to the second position shown in FIG. 2b. The pressure medium is thereby admitted from the chamber 208 via the channel 211 provided in the shank part 207 to the nozzle 203, from where it is injected into the air intake duct. The channel 211 is typically provided with a throttle element 217. The piston part 206 is provided with a sealing element 212 or equivalent to provide a sliding fit between it and the interior surface of the cylinder chamber 208.

Arranged in connection with the spraying head are means for moving the spraying head 201 from the protruding position into the retracted position. Typically, the system comprises a spring element 210 arranged between the spraying head 201 and the holder 202 to move the spraying head from the protruding position to the retracted position. The spring element is preferably placed between the piston element 206 and the end piece of the holder part 202 adjoining the air intake duct 205. The spring is a helical spring, which is compressed when the nozzle head moves into the protruding position. When the pressure of the pressure medium acting on the piston falls below the desired value, the spraying head is moved to the retracted position by the action of the spring force and/or a possible pressure acting in the air intake duct.

The spraying head is secured to the wall 205 of the air intake duct typically by a rigid joint, using e.g. fastening means 204, such as screws or bolts, at its flange 215. The wall 205 of the air intake duct is provided with an opening for the spraying head. In the embodiment in FIG. 2a, the spraying head, at least its nozzles 203, as seen in the direction of motion of the spraying head, remain outside the imaginary surface formed by the inner edges of the opening in the wall of the air intake duct, i.e. the edges on the interior side of the air intake duct. If the spraying head is of a substantially cylindrical form, then the nozzles typically open to the cylindrical surface. Similarly, if the spraying head has a conical form, then the nozzles open to the conical surface. Typically, the nozzles open to the lateral surface of the spraying head.

Figure 3B:
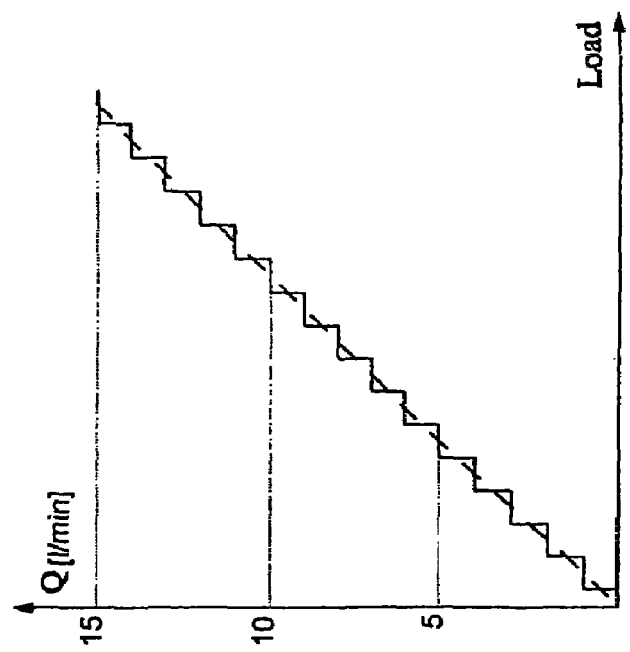
FIG. 3b presents a graph representing the operation of the system in FIG. 3a, FIG. 4 presents a spraying system according to the invention and a cleaning system utilized in the spraying system.
Figure 3A:
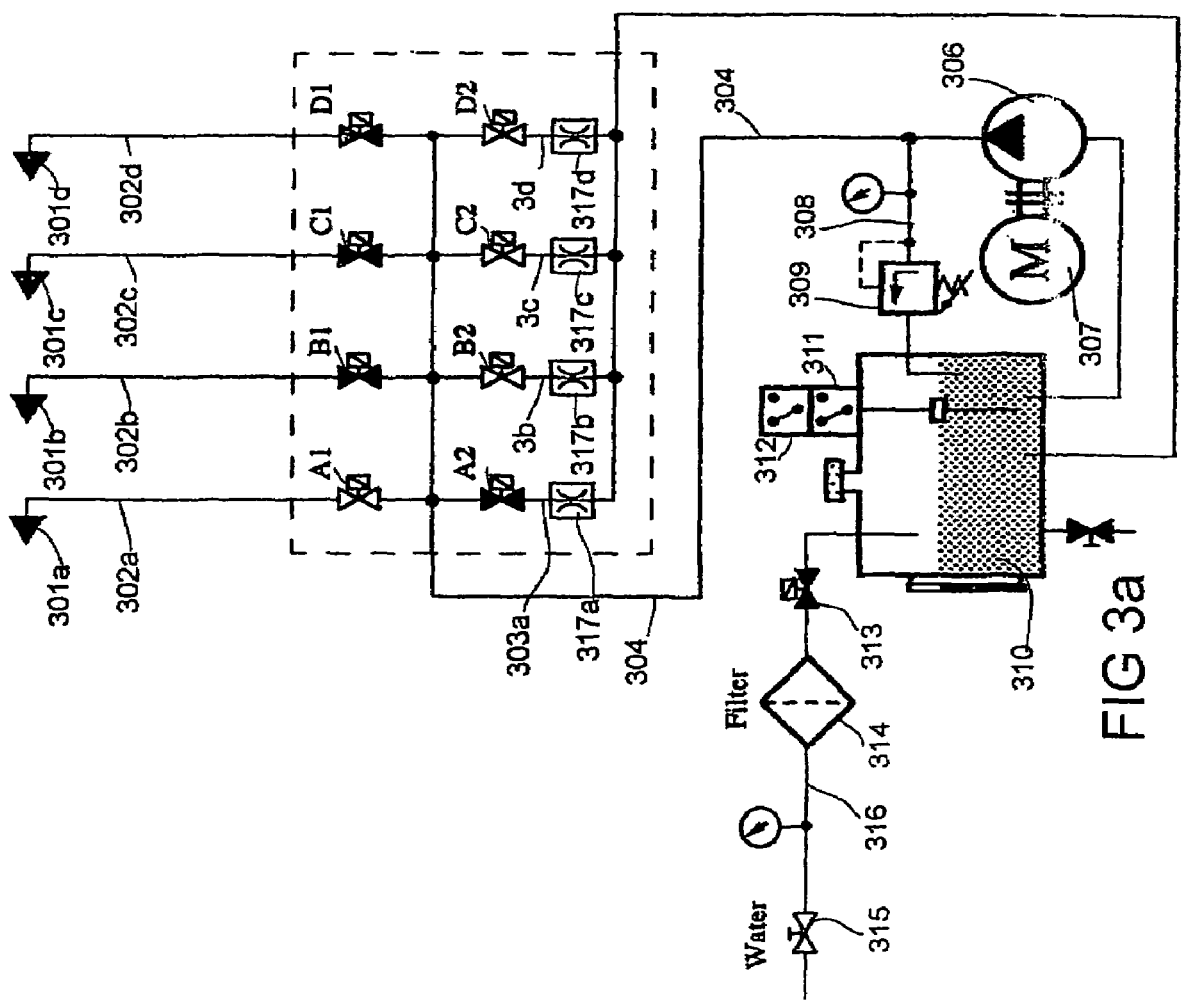
FIG. 3a presents a diagram of a control system of the spraying system of the invention.

FIG. 3a presents a diagram schematically representing the control arrangement used in the water spraying system of the invention. The system comprises at least two nozzles 301a, 301b, 301c, 301d, which are disposed in the engine's air intake duct (not shown) or in a corresponding space leading to the combustion chamber of the engine for humidification of the intake air. In the case presented in the figure, four nozzles are shown, with a channel 302a, 302b, 302c, 302d leading to each nozzle from a supply pipe 304 supplying a pressure medium, preferably an aqueous liquid. The pressure medium is fed into the supply piping by a pump 306, driven by a drive device 307. The pump pumps the pressure medium from a pressure medium source 310, such as tank. Reference numbers 308 and 309 indicate a pipe and a relief valve through which the liquid can flow in case the pump pressure and the pressure in pipe 308 exceed a certain presettable limit value. Reference numbers 313 and 315 indicate valves, and reference number 314 indicates a filter. The filter prevents particles that might clog the valves 301a, 301b, 301c, 301d of the spraying head from entering the spraying system. When the liquid surface in the container 310 falls below a certain level, a level switch 311 will open valve 313. Switch 324 will close the valve when the water level in the container 310 has risen to a given height.

The pump 307 is preferably a constant-output pump which always pumps the same amount Q of pressure medium per unit of time into the supply pipe 304 when running. The pump drive is preferably a motor, such as an electrically operated direct-current motor, which drives the pump at a constant speed. The channels 302a, 302b, 302c, 302d leading to the nozzles are provided with valve elements A1, B1, C1, D1, which can be opened and closed as instructed by the control system. The control system typically controls the valves A1, B1, C1, D1 according to the required amount of liquid to be sprayed, preferably according to the engine load, so the amount of liquid supplied into the intake air typically increases with the engine load. The system comprises a return pipe 305, through which the liquid quantity not fed into the intake air returns to the tank 310. Disposed between the supply pipe 304 and the return pipe 305 are valve elements A2, B2, C2, D2, which can be opened and closed as instructed by the control system. For each closed feed channel 302a, 302b, 302c, 302d of the nozzles 301a, 301b, 301c, 301d, a corresponding channel 303a, 303b, 303c, 303d opening into the return pipe 305 is provided. If all the nozzle feed channel valves A1, B1, C1, D1 are open, then the valves A2, B2, C2, D2 in the flow passages leading to the return pipe 305 are closed, and vice versa. The sum of the k-values of the return channels substantially corresponds to the sum of the k-values of the closed nozzles and those of their feed channels. In the embodiment represented by FIG. 3, each channel 303a, 303b, 303c, 303d leading into the return pipe 305 is provided with a throttle element, which is adjusted to match the k-value of the nozzle in closed state. Thus, the sum of the k-values in the system remains substantially constant. In the case of FIG. 3, valve element A1 in the feed channel 302a leading from the supply pipe to valve 301a is open, thus allowing the liquid to flow to the nozzle. The valves B1, C1, D1 in the feed channels leading to the other valves are closed, thus preventing liquid flow to valves 301b, 301c, 301c. Correspondingly, valve A2 in the channel 303a leading to the return pipe 305 is closed, preventing liquid flow through channel 303a into the return pipe. Valves B2, C2, D2 in the other channels 303b, 303c, 303d arranged between the supply pipe and the return pipe are open, permitting the liquid to flow through them into the return pipe 305. The channels are provided with a throttling 317b, 317c, 317d or equivalent, which corresponds to the k-values of the closed nozzles. By providing nozzles having different characteristics and different flow rate capacities, a very large control range can be covered accurately. In the case of FIG. 3, by using a pump with an output capacity of 15 l/min, where nozzle 301a has an output of 1 l/min, nozzle 301b an output of 2 l/min, nozzle 301c an output of 4 l/min and nozzle 301d an output of 8 l/min, the entire range of 1–15 l/min can be covered by opening and closing the valves. FIG. 3b visualizes the quantity of water Q supplied into the air intake duct as a function of engine load (Load). The pressure is typically constant in the system. When the engine load increases, the amount of liquid flowing into the intake air through the nozzles is increased by increasing the number of nozzles and/or by selecting a nozzle that permits a larger liquid quantity to flow through it in a unit of time. When the engine load decreases, the amount of liquid flowing through the nozzles supplying liquid into the intake air is reduced by reducing the number of nozzles and/or by selecting a nozzle that permits a smaller amount of liquid to flow through it in a unit of time. In connection with the above-described operation, the amount of water supplied into the return pipe by the "by-pass" route is correspondingly adjusted in inverse proportion to the amount of water fed through the nozzles. In a corresponding manner, the throttling is adjusted so that at least when liquid is being injected into the intake air in the system, the sum of the k-values ($\Sigma$k) remains substantially constant regardless of whether the liquid is passed through the nozzles or through the return pipe or whether a portion of the liquid quantity is passed through the nozzles and another portion, substantially the rest of it through the return pipe. The flow rate for a nozzle is given by the formula $Q=k\sqrt{p}$, where Q is the flow rate, p is the pressure forcing the medium through the nozzle and k is the nozzle resistance.

The value of the factor k depends on the area of the nozzle aperture, among other things. In the case of circular aperture, the value of the factor k depends on the aperture diameter d according to the equation $k=0.78*d^2$ when the aperture is a so-called short aperture. The resistance of the return pipe is adapted to correspond to the resistance of the closed nozzles. The liquid flowing back in the return pipe 305 can also be circulated via a heat exchanger, which makes it possible to utilize the heat of the liquid and/or to supply more heat to it via the heat exchanger. The return pipe 305 may also be provided with a filter element to filter out impurities from the circulated liquid. Naturally the water coming from the liquid source can also be passed through a filter element to remove at least some of the impurities.

Figure 4:
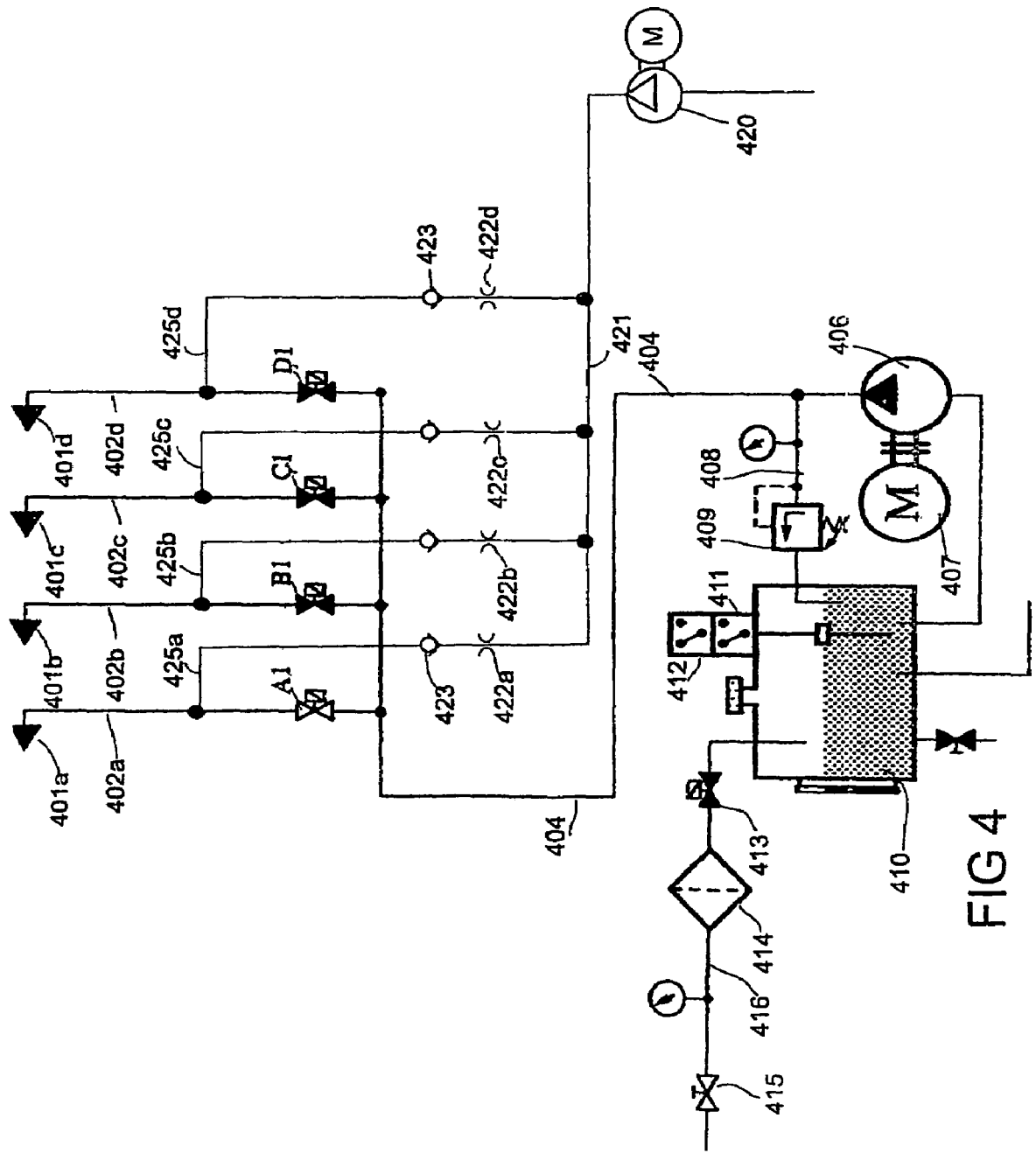

The system may additionally comprise means for producing pressurized air to further reduce the droplet size. The system may further comprise equipment designed for producing pressurized air, by means of which the nozzles are cleaned after use, preventing them from becoming clogged. FIG. 4 presents a cleaning system in a water spraying system, especially in a water spraying system designed for the humidification of intake air, which comprises at least one spraying nozzle 401*a*, 401*b*, 401*c*, 401*d* for injecting liquid into the intake air. The apparatus comprises means 420, 421, 425*a*, 425*b*, 425*c*, 425*d* for supplying a second pressure medium to the nozzle 401*a*, 401*b*, 401*c*, 401*d* after the supply of a first pressure medium, such as a liquid and/or gas intended for the humidification of the intake air to the nozzle has been interrupted, to prevent clogging of the nozzle. The apparatus comprises a pressure medium source, such as a pump 420 pumping pressurized air, and means for conveying the pressure medium from the pressure medium source to the nozzle 401*a*, 401*b*, 401*c*, 401*d*. For conveying the second pressure medium, a pipeline 421, 425*a*, 425*b*, 425*c*, 425*d* connected in the nozzle feed channel 402*a*, 402*b*, 402*c*, 402*d* between the valve element A1, B1, C1, D1 and the nozzle 401*a*, 401*b*, 401*c*, 401*d* is used. Each pipeline 425*a*, 425*b*, 425*c*, 425*d* used for supplying the second pressure medium is provided with a check valve 423 to prevent the first pressure medium from flowing through the supply channel to the other nozzles and/or to the pressure medium source. The second pressure medium is a liquid and/or gas.

Figure 5:
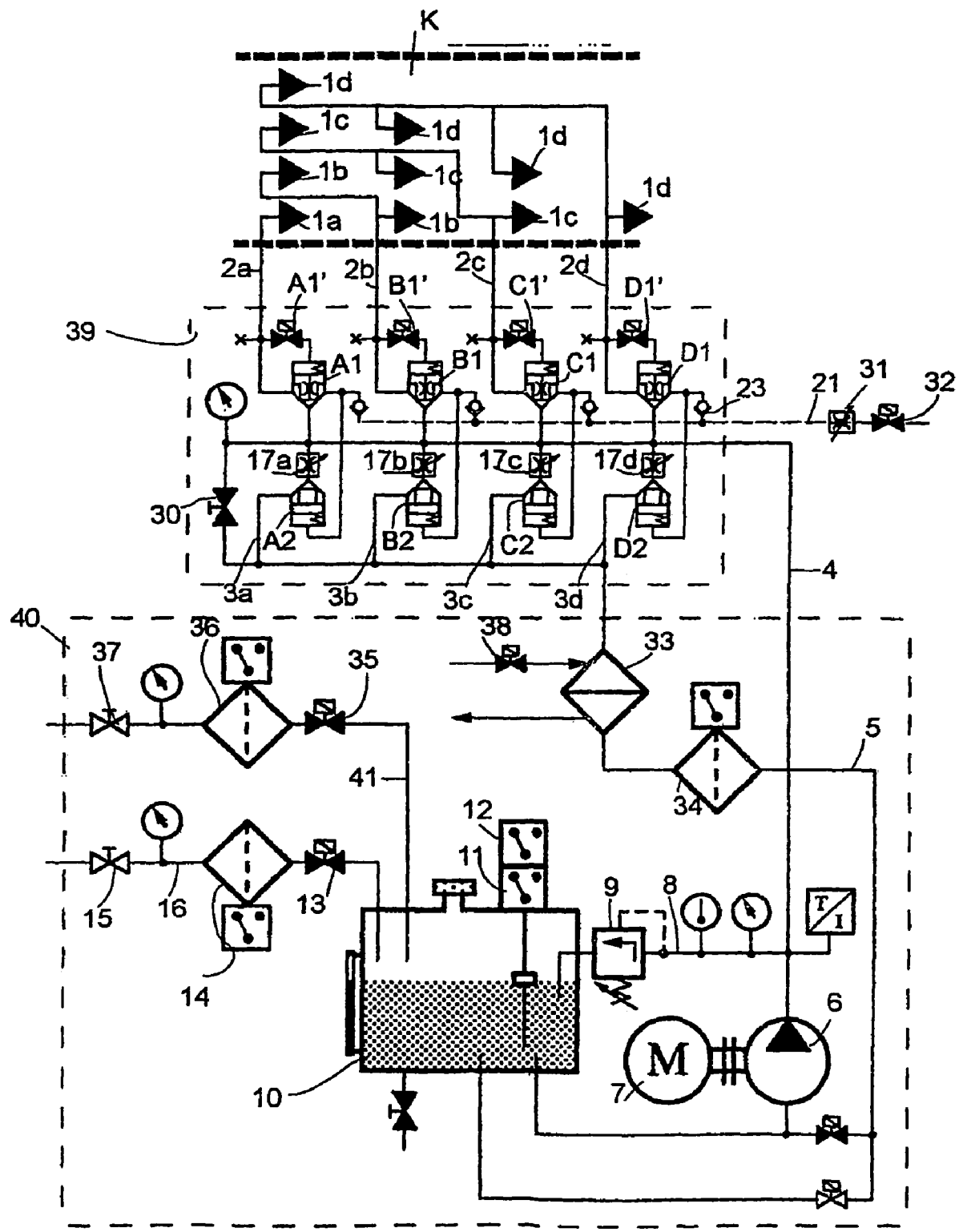
FIG. 5 presents a diagram of a system according to the invention.

FIG. 5 presents yet another embodiment of the water spraying system of the invention. It comprises nozzles 1*a*, 1*b*, 1*c*, 1*d* arranged in feed channels 2*a*, 2*b*, 2*c*, 2*d*, each channel having a different number of nozzles placed at different positions in the air intake duct K. In this embodiment, too, the valve elements A1–A2, B1–B2, C1–C2, D1–D2 controlling the liquid flow going into the nozzle feed channels 2*a*, 2*b*, 2*c*, 2*d* and the return channel 3*a*, 3*b*, 3*c*, 3*d* are controlled in pairs. These valve element pairs are most appropriately controlled by means of solenoid valves A1', B1', C1', D1'. The return channels are provided with variable throttles 17*a*, 17*b*, 17*c*, 17*d*, by means of which the flow can be adjusted as desired. Correspondingly, the pressure can also be varied by opening and closing the throttle elements in the return channel. In this embodiment, the valve elements and throttles are arranged as control blocks, indicated in the figure by the number 39 and a broken line. This embodiment likewise comprises a nozzle cleaning system, in which a pressure medium, such as pressurized air, is supplied from a pressure medium source via a pipeline 21 by means of a pump. The pressure medium supply line 21 of the cleaning system is provided with a variable throttle element for the control of the flow. The control system further comprises a temperature regulating system, whereby the temperature of the liquid to be injected can be adjusted. The system comprises a heat exchanger element 33 arranged in the return line 5, to which heat can be supplied via a line and valve 38. When a small amount of liquid is to be injected, most of the liquid quantity supplied by the pump returns back via the return line. The pressure is at least partly converted to heat as it passes through the throttle elements 17*a*–17*d*, the liquid entering the return line being thus heated. From the return line, at least some of the liquid can be conveyed directly to the pump 6 or into the tank 10. In this case, the heat exchanger element 33 may be superfluous because the system itself generates sufficient heat in the liquid. Similarly, the heat exchanger 33 may also recover heat and transfer it to another part. The return line 5 is also preferably provided with a filter element 34 for removing impurities from the liquid.

In the system of the invention, some other pressure medium, such as gas, preferably air, can also be supplied into the liquid. In this case, a solution of the same type as e.g. in Finnish patent application FI 20010514, which is as yet unpublished on the date of application of the present application.

It is obvious to the person skilled in the art that the invention is not limited to the embodiments described above, but that it may be varied within the scope of the claims presented below.

The invention claimed is:

1. In a spraying system of an air intake duct of a piston engine for humidification of intake air for the piston engine to reduce nitrogen oxide emissions, the improvements comprising:

at least one nozzle (9,10,11,12,13) for spraying a mist of an aqueous liquid into the air intake duct (2); and means for accomplishing the spraying of the mist of the aqueous liquid in dependence on at least one of load, speed of rotation or temperature of the engine, characterized in that the system comprises nozzles (9,10,11, 12,13) having different properties, the number and/or type of nozzles spraying being varied according to the amount of liquid required.

2. Spraying system according to claim 1, characterized in that the mist sprayed into the air intake duct (2) is distributed by several of the nozzles (9,10, 11,12,13).

3. Spraying system according to claim 1, characterized in that the mist sprayed is at least one of distributed in the air intake duct (2) over an area or to points with a higher temperature or air flow than their vicinity for optimizing vaporization.

4. Spraying system according to claim 1, characterized in that a number of the nozzles (9,10,11,12,13) is adapted according to an amount of liquid to be sprayed.

5. Spraying system according to claim 1, characterized by means for adapting at least one of a point or direction of the spray of the mist according to an amount of the aqueous liquid to be sprayed.

6. System according to claim 1, characterized in that the several nozzles (9–13) in the system are arranged on the same mounting frame (6,7).

7. System according to claim 1, characterized in that the system comprises a regulating apparatus, by means of which the injection action of at least some of the nozzles (9–13) can be con-trolled.

8. System according to claim 1, characterized in that the system comprises at least one valve element (13,14), by means of which the liquid flow passage leading to one of the nozzles (9–13) is adjusted and/or opened/closed.

9. System according to claim 1, characterized in that the system comprises a regulating system, by means of which the pressure in at least one supply pipe (17) leading to the nozzles is kept at least nearly constant or at a predetermined level independently of the output of the pump.

10. System according to claim 1, characterized in that the system comprises an output regulating pump unit, by means of which the pressure is regulated by pressure control so that the pressure in at least one supply pipe (17) leading to a nozzle is constant.

11. System according to claim 1, characterized in that the system comprises a control system comprising a constant-output pump and controlling the pressure by means of a valve system to maintain a constant pressure in at least one supply pipe leading to a nozzle.

12. System according to claim 1, characterized in that the system further comprises a system for cleaning the nozzles and/or keeping the nozzles clean.

13. System according to claim 1, characterized in that the pressure in the liquid supply piping is 10–300 bar.

14. System according to claim 1, characterized in that the droplet size of the water mist is typically below 200 micrometers.

15. System according to claim 1, characterized by means for supplying at least one of a pressure medium, gas, or air to the at least one nozzle.

16. System according to claim 1, characterized by means for controlling the adjusting of the temperature of the liquid.

17. System according to claim 1, and comprising means for adjusting a temperature of the aqueous liquid for the spraying.

* * * * *